J. LUEBBERT & L. STEPHANY.
DETACHABLE NON-SKID DEVICE FOR VEHICLE WHEELS.
APPLICATION FILED AUG. 22, 1917.
1,268,257.
Patented June 4, 1918.
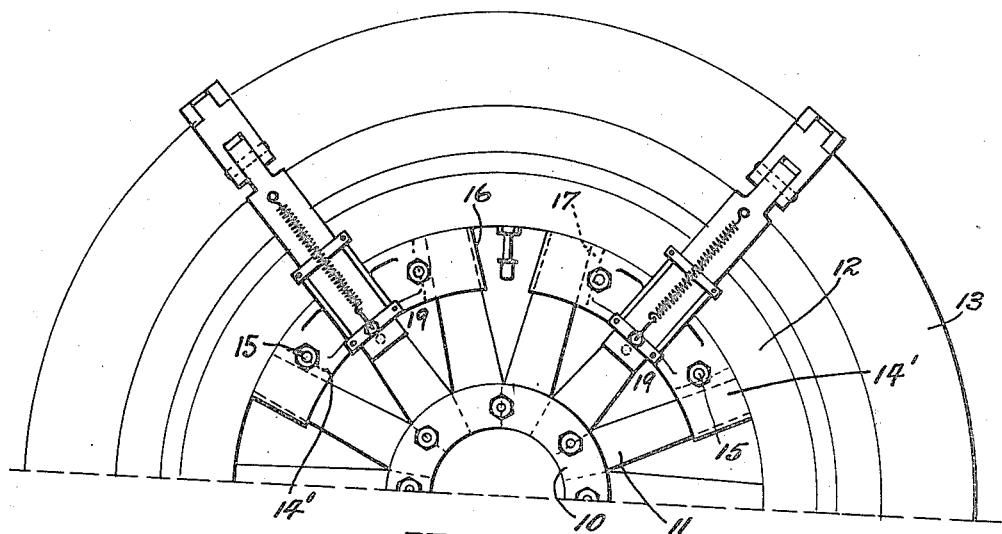
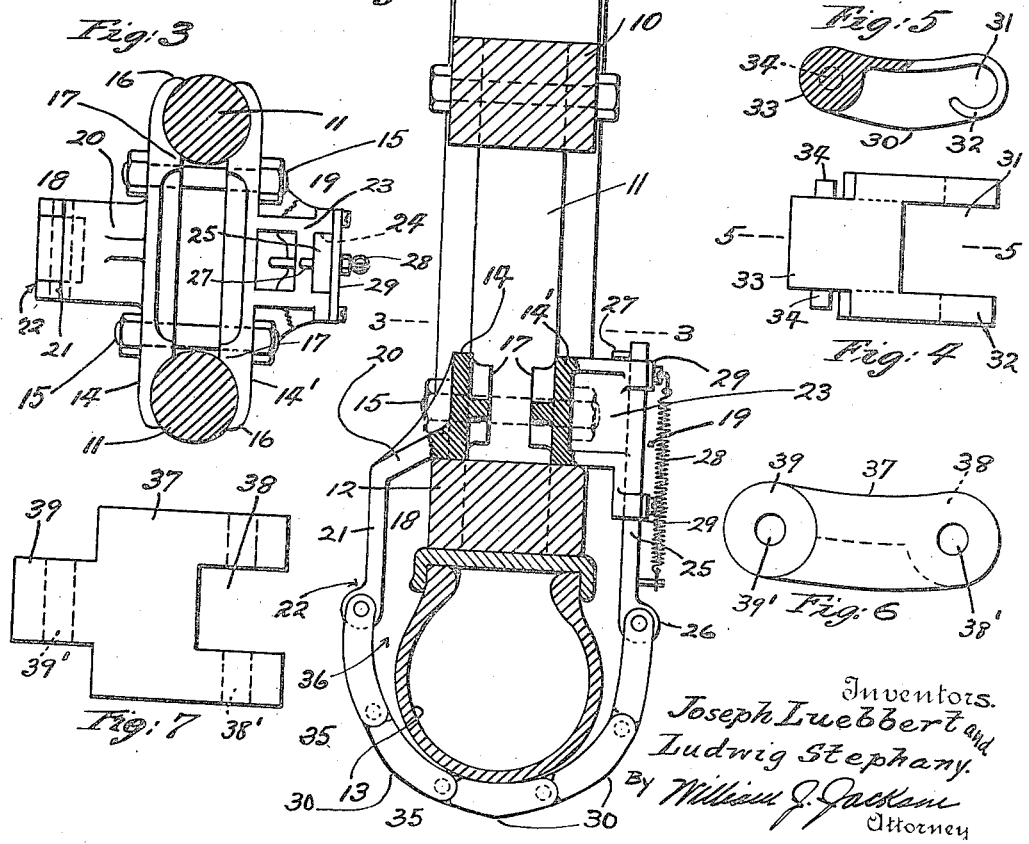
Inventors.
Joseph Luebbert and
Ludwig Stephany.
By William J. Jackson
Attorney

UNITED STATES PATENT OFFICE.

JOSEPH LUEBBERT AND LUDWIG STEPHANY, OF PHILADELPHIA, PENNSYLVANIA.

DETACHABLE NON-SKID DEVICE FOR VEHICLE-WHEELS.

1,268,257.  Specification of Letters Patent.  Patented June 4, 1918.

Application filed August 22, 1917.  Serial No. 187,623.

*To all whom it may concern:*

Be it known that we, JOSEPH LUEBBERT and LUDWIG STEPHANY, both citizens of the United States, residing at the city of Philadelphia, in the county of Philadelphia and State of Pennsylvania, have jointly invented an Improved Detachable Non-Skid Device for Vehicle-Wheels, of which the following is a specification.

The invention has for its principal object to provide a non-skid device which is applicable for use in connection with pleasure or commercial motor-vehicles and which may be readily and expeditiously attached and removed as occasion demands. A further object is to provide a non-skid device which in use is calculated to produce little or no noise. A further object is to provide a non-skid device which is strong and durable and so constructed that in use it is yieldingly connected with respect to a tire so that inflation and deflation of a tire is accommodated by the device. Other and further objects of the invention reside in the providing of general details of construction and in the connection and combination of parts as will hereinafter appear.

The invention consists of the improvements hereinafter described and finally claimed.

The nature, characteristic features and scope of the invention will be more fully understood from the following description taken in connection with the accompanying drawings forming part hereof and in which:

Figure 1 is a face view of a portion of a vehicle wheel having the non-skid device of the invention applied thereto.

Fig. 2 is a fragmentary view in cross-section of a wheel equipped with a non-skid device of the invention.

Fig. 3 is a sectional view taken upon the line 3—3 of Fig. 2.

Fig. 4 is a plan view of one of the links which make up the tread-members.

Fig. 5 is a view in section thereof taken upon the line 5—5 of Fig. 4.

Figs. 6 and 7 are respectively a side and plan view of a modified form of link.

For the purpose of illustrating our invention, we have shown in the accompanying drawings forms thereof which are at present preferred by us, since the same has been found in practice to give satisfactory and reliable results, although it is to be understood that the various instrumentalities of which our invention consists can be variously arranged and organized and that our invention is not limited to the precise arrangement and organization of the instrumentalities as herein shown and described.

In the drawings and referring more particularly to Figs. 1 to 7 is disclosed a standard type of vehicle wheel consisting of a hub 10, spokes 11, rim 12 and tire 13. In practising the invention we rigidly attach upon opposite sides of a pair of spokes 11 and in abutting relation with the rim 12, relatively thin, flat ring sections 14 and 14'. Bolts 15 are employed for effecting the attachment, which is permanent. The ring sections are each provided with curved outer ends 16 and lugs 17, see Fig. 3. These parts engage around a spoke to prevent endwise movement. Rigidly and permanently attached to each ring section 14 preferably formed integral therewith is a radially disposed member 18 and similarly attached to the ring 14', which is upon the outer face of a wheel is member 19. Each member 18 consists of a ribbed plate 20 provided with an extension 21 having at its free end a forked portion 22 apertured for the reception of link pins the purpose of which will presently appear. Each member 19 consists of an angle iron construction 23 having a vertical guide way 24 upon its outer face, see Fig. 3. Mounted in the guide way is a slide 25 the outer end 26 of which is provided with pins to receive the hooked end of a link. The inner end of the slide is provided with a stop 27 to limit outward movement thereof and a coiled spring 28 is present between a fixed part of the member 19 and the slide to normally draw said slide inwardly. Plates 29 are secured to part 23 for maintaining slide 25 in place.

A description will now be given of the tread-devices which are adapted for detachable connection with respect to the above described members 18 and 19. In practice these tread-devices are adapted to be carried in the tool-box of a vehicle when not in use. The tread-devices each comprise a series of links connected chain-fashion so as to fit over a tire, one end of a tread-device being secured to member 18 and the other and thereof to member 19, see Fig. 2. Each link of such tread-device consists of a slightly curved unit forked at one end as at 31, see Figs. 4 and 5 the tines 32 of which are hook-shaped and the opposite end of which is provided with a tongue 33 provided with pins 34. In practice a tongue 33 with its pins is fitted to the bifurcated end of a unit and hooked with respect thereto, to form a knuckle joint. It will be understood that a tongue 33 of a link is connected to the forked end of member 18 and that the forked end of a link is connected to member 19. Thus positioned with respect to a wheel it will be understood that a tread-device is afforded a yielding as well as cushioned relation with respect to a wheel, readily responding to inflation and deflation of a tire and to unevenness in a roadway. It will be observed also that there is ample clearance as at 36 between a tread-device and a tire, see Fig. 2. Such a tread-device affords an efficient non-skid element, is noiseless in use as compared with chains and the like, is of simple and inexpensive construction, may be readily positioned in a few moments time without necessitating "jacking" of a vehicle, the link-parts may be easily replaced when worn and the device is adjustable to various sized tires in that the linked portion may be readily expanded by substituting additional links. Some of the links may be provided with pointed parts 30 in order to enhance non-skid properties.

In Figs. 6 and 7 the links 37 are slightly modified, one end being bifurcated as at 38, apertured as at 38′ and the opposite end being provided with a tongue 39 apertured as at 39′. The tongue 39 is caused to engage with a bifurcated end of a unit to provide a chain-like tread-device and pintles are employed for effecting the connection.

It will now be apparent that we have devised a novel and useful construction which embodied the features of advantage enumerated as desirable in the statement of the invention and the above description and while we have in the present instance shown and described the preferred embodiments thereof which have been found in practice to give satisfactory and reliable results, it is to be understood that the same is susceptible of modification in various particulars without departing from the spirit or scope of the invention or sacrificing any of its advantages.

What we claim is:

1. In a non-skid device the combination of a vehicle wheel, oppositely disposed supports clamped with respect to the spokes of the wheel of which one support is provided with a fixed extension and of which the other support is provided with a guideway upon its outer face, a resiliently sustained slide for said guide-way, means to limit the outward movement of said slide and a tread-device fitted over the tread portion of said wheel and secured to said fixed extension and said slide respectively.

2. In a non-skid device the combination of a vehicle wheel, oppositely disposed supports clamped with respect to the spokes of the wheel of which the inner support is provided with a fixed extension and of which the outer support is provided with a guideway, a slide for said guide-way, a coiled spring interposed between the innermost end of the outer support and outermost end of said slide, means upon said slide for abutting against the outer support to limit the outward movement of said slide and a tread-device fitted over the tread portion of said wheel and secured to said fixed extension and slide respectively.

In testimony whereof, we have hereunto set our hands this 20th day of August, 1917.

JOSEPH LUEBBERT.
LUDWIG STEPHANY

Witnesses:
WILLIAM J. JACKSON.
HELEN M. BYRNE.